United States Patent
Vajravel

(10) Patent No.: US 9,639,496 B2
(45) Date of Patent: May 2, 2017

(54) SYSTEMS AND METHODS FOR PROVIDING PROTOCOL INDEPENDENT DISJOINT DRIVE LETTER SETS

(71) Applicant: Dell Products L.P., Round Rock, TX (US)

(72) Inventor: Gokul Thiruchengode Vajravel, Namakkal (IN)

(73) Assignee: Dell Products L.P., Round Rock, TX (US)

(*) Notice: Subject to any disclaimer, the term of this patent is extended or adjusted under 35 U.S.C. 154(b) by 300 days.

(21) Appl. No.: 14/594,216

(22) Filed: Jan. 12, 2015

(65) Prior Publication Data

US 2016/0124885 A1    May 5, 2016

Related U.S. Application Data

(63) Continuation-in-part of application No. 14/528,655, filed on Oct. 30, 2014.

(51) Int. Cl.
*G06F 13/00*     (2006.01)
*G06F 13/40*     (2006.01)
*G06F 9/44*      (2006.01)

(52) U.S. Cl.
CPC ........ *G06F 13/4072* (2013.01); *G06F 9/4411* (2013.01)

(58) Field of Classification Search
None
See application file for complete search history.

(56) References Cited

U.S. PATENT DOCUMENTS

2013/0111561 A1*   5/2013   Kaushik ............... H04L 63/105
                                                              726/4

OTHER PUBLICATIONS

Microsoft, "DefineDosDevice function", Windows Dev. Center, 3 pages, available at https://msdn.microsoft.com/en-us/library/windows/desktop/aa363904 (v=vs.85).aspx, 2015.
Microsoft, "Defining an MS-DOS Device Name", Windows Dev. Center, 1 page, available at https://msdn.microsoft.com/en-us/library/windows/desktop/aa363908(v=vs.85).aspx, 2015.
Microsoft, "Filter Drivers (Window Drivers)", 1 page, available at https://msdn.microsoft.com/en-us/library/windows/hardware/ff545890(v=vs.85).aspx, 2015.

(Continued)

*Primary Examiner* — David E Martinez
(74) *Attorney, Agent, or Firm* — Baker Botts L.L.P.

(57) ABSTRACT

A system and method for mounting multiple devices on an SLR enable information handling system is disclosed herein. A drive-letter may be assigned to a first user session in a first user session namespace only. A second user may have access to the same drive-letter as the mounting of drive-letters is specific to each specific user session and not the global namespace. A symbolic link is created for each assigned drive-letter and the corresponding drive-letter in the global namespace is deleted allowing for more than the standard mounting of only twenty-six different devices.

20 Claims, 6 Drawing Sheets

(56) References Cited

OTHER PUBLICATIONS

Microsoft, "IOCTL_MOUNTDEV_LINK_CREATED control code (Windows Drivers)", 1 pages, available at https://msdn.microsoft.com/en-us/library/windows/hardware/ff560434(v=vs.85).aspx, 2015.

Microsoft, "IOCTL_MOUNTMGR_DELETE_POINTS control code (Windows Drivers)", 1 page, available at https://msdn.microsoft.com/en-us/library/windows/hardware/ff560461 (v=vs.85).aspx, 2015.

Microsoft, "IOCTL_MOUNTMGR_QUERY_POINTS control code (Windows Drivers)", 2 pages, available at https://msdn.microsoft.com/en-us/library/windows/hardware/ff560474(v=vs.85).aspx, 2015.

Microsoft, "IOCTL_STORAGE_GET_DEVICE_NUMBER control code (Windows)", Windows Dev. Center, 2 pages, available at https://msdn.microsoft.com/en-us/library/windows/desktop/bb968800(v=vs.85).aspx, 2015.

Microsoft, "IoGetDeviceObjectPointer routine (Windows Drivers)", 2 pages, available at https://msdn.microsoft.com/en-us/library/windows/hardware/ff549198(v=vs.85).aspx, 2015.

Microsoft, "IoReportTargetDeviceChange routine (Windows Drivers)", 2 pages, available at https://msdn.microsoft.com/en-us/library/windows/hardware/ff549625(v=vs.85).aspx, 2015

Microsoft, "IoReportTargetDeviceChangeAsynchronous routine (Windows Drivers)", 2 pages, available at https://msdn.microsoft.com/en-us/library/windows/hardware/ff549634(v=vs.85).aspx, 2015.

Microsoft, "System-Defined Device Setup Classes Available to Vendors (Windows Drivers)", 5 pages, available at https://msdn.microsoft.com/en-us/library/windows/hardware/ff553426(v=vs.85).aspx, 2015.

SimplyCore LLC, "USB Redirector TS Edition v2.4 User Manual", www.incentivespro.com, 2 pages, available at http://www.incentivespro.com/helps/usb-redirector-ts-ts/features_isolation.htm, 2014.

USB Secure®, USB Secure User Guide, NewSoftwares.net, 29 pages, 2014.

* cited by examiner

SYSTEMS AND METHODS FOR PROVIDING PROTOCOL INDEPENDENT DISJOINT DRIVE LETTER SETS

CROSS-REFERENCES TO RELATED APPLICATIONS

The present application is a continuation-in-part of application Ser. No. 14/528,655 entitled "Session-Level-Restriction for Universal Serial Bus Storage Devices" filed on Oct. 30, 2014.

TECHNICAL FIELD

This disclosure relates generally to information handling systems and, more particularly, to protocol independent systems and methods for providing disjoint driver letter sets, and in particular, for providing sets for session isolated mass storage devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

A thin client, or as it is sometimes referred to a lean client or a slim client) is an information handling system or an executable software program running on an information handling system. A thin client generally relies on another information handling system, such as a server, to fulfill at least some of the requested computational roles. For example, a user can access applications or other computational support services from a server by logging into the server from a thin client, for example, a terminal device. Multiple users may log into the same server from multiple terminal devices and may simultaneously request services from the server.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
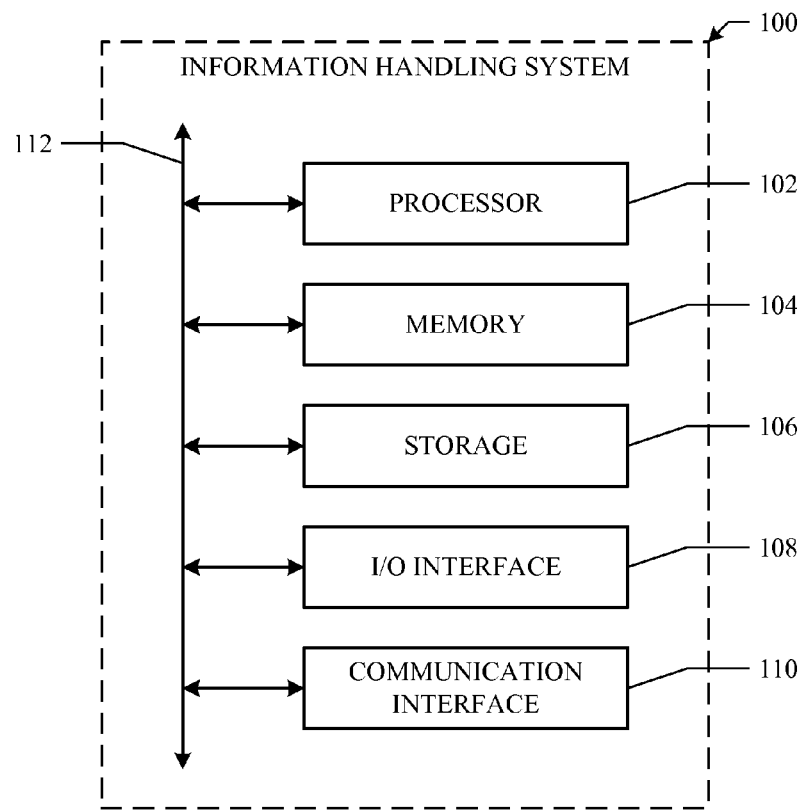
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
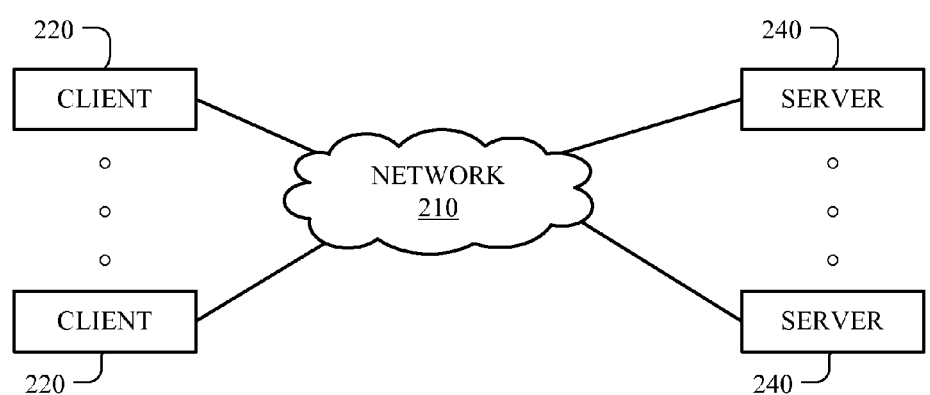
FIG. 2 is an example of a network environment.

Particular embodiments are best understood by reference to FIGS. 1-2, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 includes only the necessary components for a thin client to be operational and for the thin client to interface with one or more servers, thin clients, or other devices.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (e.g. corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g. videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g. thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g. automatically) device discovery, tracking of assets (e.g. hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more client devices 220 of network 210.

In particular embodiments, a client device such as client device 220 (e.g. a thin client) may be designed with minimal or limited storage capacity (e.g. in a hard disk). The client device may be required, however, to run an operating system such as WINDOWS EMBEDDED or WINDOWS SERVER, but the footprint of such an operating system may grow over time with newer releases or updates. Hence, client devices may, over time, begin to run low on free storage space (e.g. in the hard disk). Unwanted files may be deleted or full volume compression of the storage medium (e.g. the hard disk) may be implemented to increase available storage space. However, full volume compression may introduce performance shortcomings (e.g. increased number of instruction cycles required to compress/uncompress data in the volume) from the point of view of an end user of the client device. In particular embodiments, optimized volume compression may be implemented to reduce effective disk usage on a client device while minimizing impact on system performance.

In particular embodiments, client device 220 (e.g. a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. As such, the users of client device 220 may login to the same server 240 and perform tasks on the same server 240 substantially at the same time. In the VDI, one or more I/O devices may be connected to client device 220. In particular embodiments, in order for the I/O devices to work seamlessly, communications associated with the I/O devices may be redirected to a Virtual Desktop (VD) operating system (OS) or a Virtual Machine (VM) OS (e.g. WINDOWS SERVER 2003) of the VDI. Furthermore, communications for one or more of the I/O devices may be restricted (i.e. limited) only to a particular user session, as in session-level-restriction (SLR) or session-isolation.

SLR may be implemented for many types of I/O devices such as for example, printers, scanners, and storage devices (e.g. mass storage, pen drive, hard drive, compact disc (CD), digital video disc (DVD), and BLU-RAY disc). As an example and not by way of limitation, SLR may be implemented for an I/O device that is being operated by a current user or a current user session in a VM OS. In particular embodiments, a third-party kernel filter driver may be layered (i.e. loaded) on top of every device class of the I/O device. Accordingly, one or more of the symbolic links in the device stack (of the I/O device) may be moved from global namespace to a pre-determined namespace of the user session. Furthermore, the third-party kernel filter driver may block other user sessions (i.e. I/O requests of the other user sessions) operating in the VM OS from accessing the device stack. As such, the I/O device may only be accessible by the current user or the current user session.

In particular embodiments, a SLR-enabled I/O device may include a single device class (i.e. driver) stack. As an example and not by way of limitation, a SLR-enabled USB printer may be associated with a printer device driver stack or a printer class stack (e.g. WINDOWS Printer Class). As such, the third-party kernel filter driver may only handle the printer device driver stack. Herein, reference to a third-party kernel filter driver may encompass a SLR filter driver, or vice-versa, where appropriate. Herein, reference to a device class stack may encompass a device driver stack, or vice-versa, where appropriate. In particular embodiments, a SLR-enabled I/O device may have two or more device driver stacks. Furthermore, the device driver stacks may be handled in a coordinated manner. As an example and not by way of limitation, a SLR-enabled USB storage device may include a disk driver stack and a volume driver stack. As another example and not by way of limitation, both disk driver stack and volume driver stack may be handled in a manner as described and illustrated in FIG. 5. In particular embodiments, the disk driver stack may manage a specific device type such as for example, disk or optical. In particular embodiments, the volume driver stack may present one or more volumes of the storage device to users of the VM OS. In particular embodiments, the volume driver stack may support basic or dynamic disks (e.g. redundant array of inexpensive disks (RAID)). In order to restrict both raw disk access and volume level access to the USB storage device (i.e. limit the accesses to a user session), the SLR filter driver may handle the disk driver stack and the volume driver stack in a coordinated manner. In particular embodiments, referencing the SLR-enabled USB storage device, a file-system driver stack may be mounted on top of the disk driver stack and the volume driver stack based at least on a configuration by a user or an administrator of the VM OS.

Figure 3:
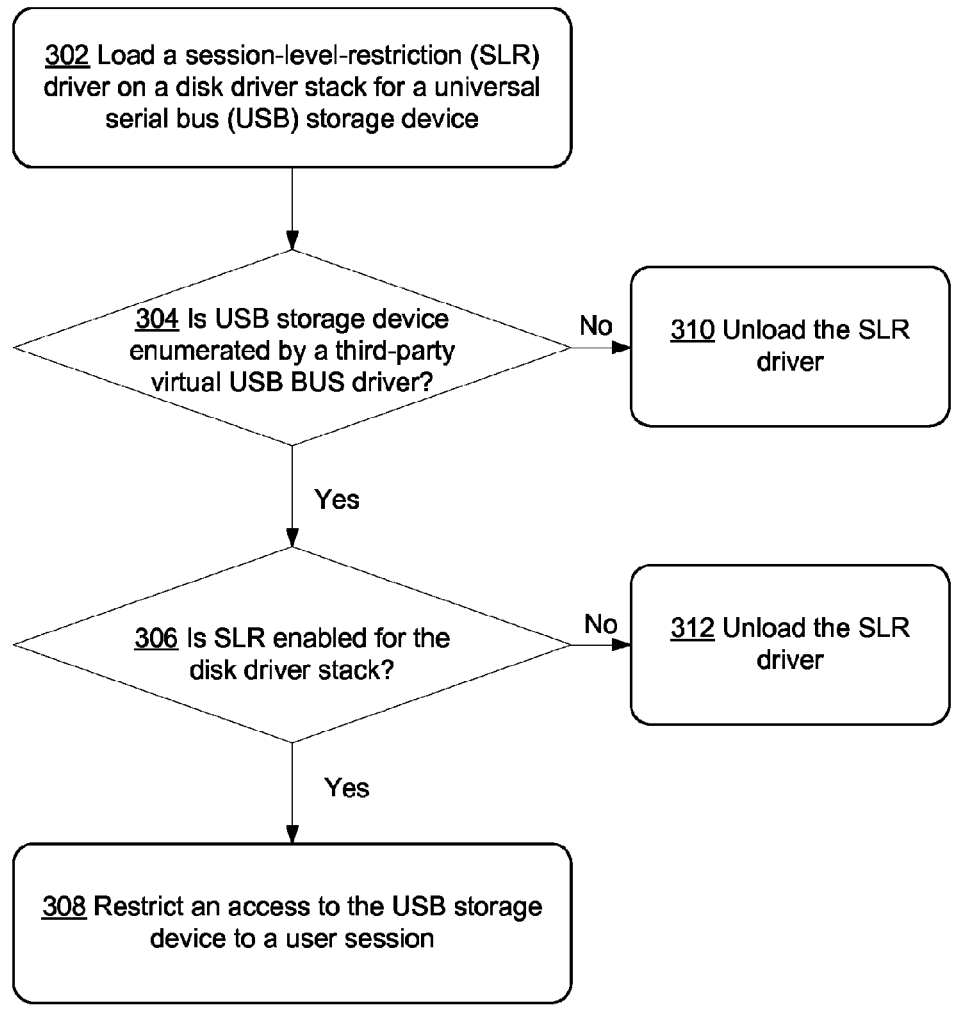
FIG. 3 is an example of a method to filter a disk driver stack of a USB storage device.

FIG. 3 illustrates an exemplary method to filter a disk driver stack of a USB storage device. In the example of FIG. 3, the USB storage device may operate in a VM OS (e.g. WINDOWS SERVER 2003) associated with client device 220. Herein, one or more of steps 302-312 may be operated by the VM OS, where appropriate. In step 302 of FIG. 3, a SLR driver (i.e. SLR filter driver) may be loaded on a disk driver stack for the USB storage device. As an example and not by way of limitation, the SLR driver may be DELL WYSE's TSREST.SYS. In particular embodiments, the disk driver stack may include one or more class filter drivers (e.g. disk, CD, DVD, or BLU-RAY class filter driver), one or more disk upper filter drivers, other suitable disk driver, or any suitable combination thereof associated with the VM OS for the USB storage device. As an example and not by way of limitation, one of the drivers in the disk driver stack may be WINDOWS SERVER 2003's USBSTOR.SYS. As another example and not by way of limitation, the disk driver stack may include DISK.SYS or CDROM.SYS. In step 304 of FIG. 3, the VM OS may determine whether the USB storage device is enumerated by a third-party Virtual USB BUS driver. As an example and not by way of limitation, the third-party Virtual USB BUS driver may be DELL WYSE's Virtual USB BUS driver/enumerator. If the third-party USB storage device is not enumerated by the third-party Virtual USB BUS driver, referencing step 310 of FIG. 3, the VM OS may unload the SLR driver. In contrast, if the third-party USB storage device is enumerated by the third-party Virtual USB BUS driver, referencing step 306 of FIG. 3, the VM OS may check whether SLR is enabled for the disk driver stack. If SLR is not enabled, referencing step 312 of FIG. 3, the VM OS may unload the SLR driver. However, if SLR is enabled for the disk driver stack, referencing step 308 of FIG. 3, the VM OS may limit an access to the USB storage device to a user or a current session of the user (i.e. a current user session). In particular embodiments, the VM OS may limit the access to the USB storage device to a pre-determined user session (e.g. session 1). In particular embodiments, the VM OS may restrict the access to the USB storage, by other users or other user sessions of the VM OS. Although this disclosure describes and illustrates particular steps of FIG. 3 as occurring in a particular order, this disclosure contemplates any suitable steps of FIG. 3 occurring in any suitable order. Moreover, although this disclosure describes and illustrates an example method for filtering particular disk driver stack of particular USB storage device including the particular steps of FIG. 3, this disclosure contemplates any suitable method for filtering any suitable disk driver stack of any suitable USB storage device including any suitable steps, which may include all, some, or none of the steps of FIG. 3, where appropriate. Furthermore, although this disclosure describes and illustrates particular components, devices, or systems carrying out particular steps of FIG. 3, this disclosure contemplates any suitable combination of any suitable components, devices, or systems carrying out any suitable steps of FIG. 3.

Figure 4:
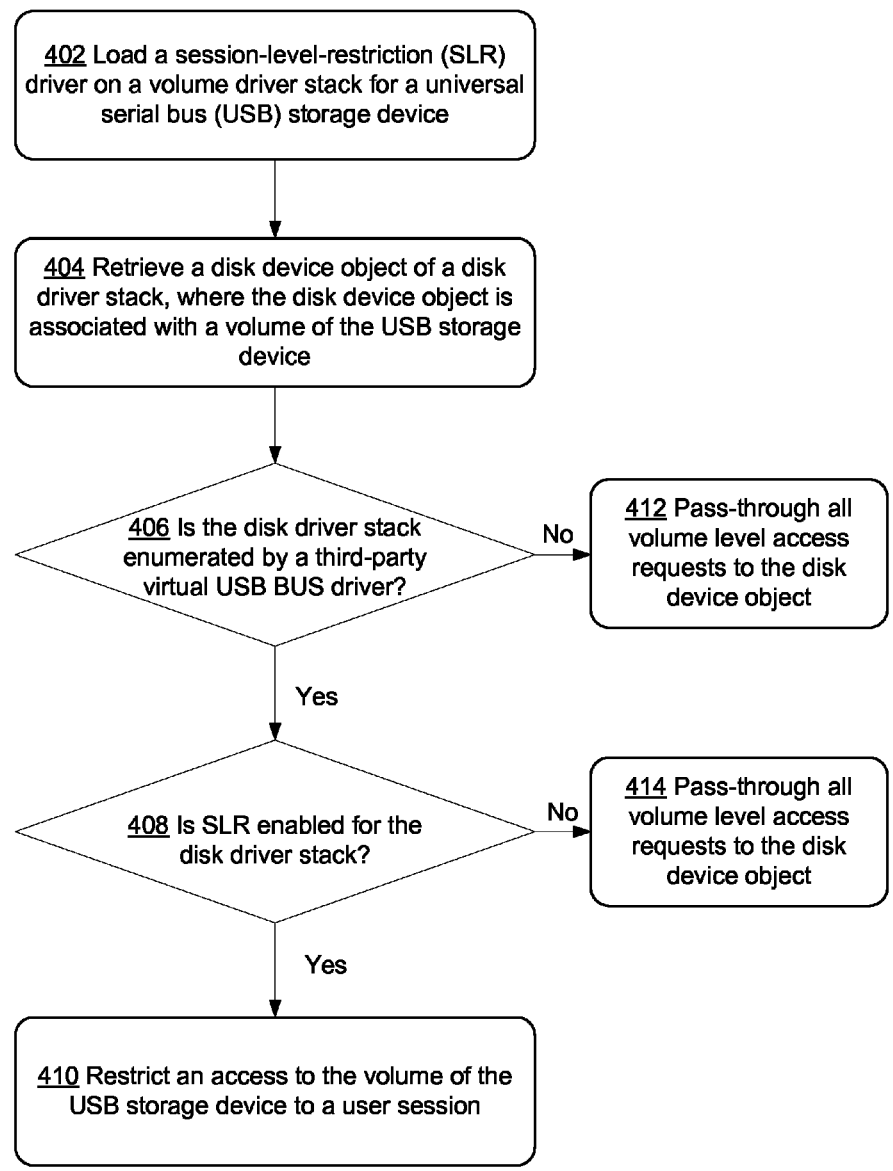
FIG. 4 is an example of a method to filter a volume driver stack of a USB storage device.

FIG. 4 illustrates an example method to filter a volume driver stack of a USB storage device. In the example of FIG. 4, the USB storage device may operate in a VM OS (e.g. WINDOWS SERVER 2003) associated with client device 220. Herein, one or more of steps 402-414 may be operated by the VM OS, where appropriate. In step 402 of FIG. 4, a SLR driver (i.e. SLR filter driver) may be loaded on a volume driver stack for the USB storage device. In particular embodiments, the SLR driver may be the SLR driver of FIG. 3. As an example and not by way of limitation, the SLR driver may be DELL WYSE's TSREST.SYS. In particular embodiments, the volume driver stack may include one or more volume upper filter drivers (e.g. VOLSNAP.SYS), a volume manager driver, other suitable volume driver, or any suitable combination thereof associated with the VM OS for the USB storage device. In step 404 of FIG. 4, the VM OS may retrieve a disk device object of a disk driver stack (e.g. disk driver stack of FIG. 3), where the disk device object may be associated with a pre-determined volume (i.e. storage partition) of the USB storage device. As an example and not by way of limitation, referencing WINDOWS-based OSes, the disk driver stack (i.e. WINDOWS disk stack) may be found by issuing IOCTL_STORAGE_GET_DEVICE_NUMBER routine to a lower driver in the plug-and-play (PnP) start completion routine. Accordingly, the IOCTL_STORAGE_GET_ DEVICE_NUMBER may return a storage number corresponding to the pre-determined volume of the USB storage device. Next, by issuing a command "\\.\PhysicalDrive<x>" where <x> is the storage number, a symbolic link may be formed corresponding to the storage number. Thereafter, a disk device object of the associated disk driver stack may be obtained by issuing IoGetDeviceObjectPointer routine with an input argument based on the symbolic link. In step 406 of FIG. 4, the VM OS may determine whether the disk driver stack is enumerated by a third-party Virtual USB BUS driver. As an example and not by way of limitation, the third-party Virtual USB BUS driver may be DELL WYSE's Virtual USB BUS driver/enumerator. If the third-party USB storage device is not enumerated by the third-party Virtual USB BUS driver, referencing step 412 of FIG. 4, the VM OS may pass-through all I/O volume level access requests (for the pre-determined volume of the USB storage device) to the retrieved disk device object. In contrast, if the third-party USB storage device is enumerated by the third-party Virtual USB BUS driver, referencing step 408 of FIG. 4, the VM OS may check whether SLR is enabled for the disk driver stack. If SLR is not enabled, referencing step 414 of FIG. 4, the VM OS may pass-through all I/O volume level access requests (for the pre-determined volume of the USB storage device) to the retrieved disk device object. However, if SLR is enabled for the disk driver stack, referencing step 410 of FIG. 4, the VM OS may limit an access to the pre-determined volume of the USB storage device to a user or a current session of the user (i.e. a current user session). In particular embodiments, the VM OS may limit the access to the pre-determined volume of the USB storage device to a pre-determined user session (e.g. session 1). In particular embodiments, the VM OS may restrict access to the pre-determined volume of the USB storage, by other users or other user sessions of the VM OS. Although this disclosure describes and illustrates particular steps of FIG. 4 as occurring in a particular order, this disclosure contemplates any suitable steps of FIG. 4 occurring in any suitable order. Moreover, although this disclosure describes and illustrates an example method for filtering particular volume driver stack of particular USB storage device including the particular steps of FIG. 4, this disclosure contemplates any suitable method for filtering any suitable volume driver stack of any suitable USB storage device including any suitable steps, which may include all, some, or none of the steps of FIG. 4, where appropriate. Furthermore, although this disclosure describes and illustrates particular components, devices, or systems carrying out particular steps of FIG. 4, this disclosure contemplates any suitable combination of any suitable components, devices, or systems carrying out any suitable steps of FIG. 4.

Figure 5:
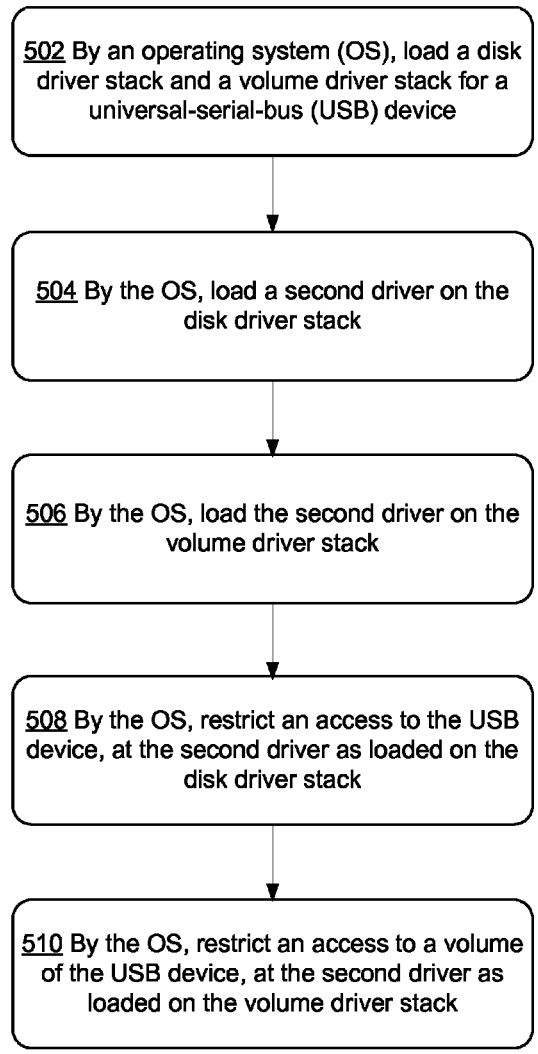
FIG. 5 is an example of a method to implement session-level-restriction (SLR) for a USB storage device.

FIG. 5 illustrates an example method to implement SLR for a USB device. In particular embodiments, the USB device may be a USB storage device, as discussed above. In step 502 of FIG. 5, an OS may load a disk driver stack and a volume driver stack for the USB device. In particular embodiments, the OS may be a VM OS of FIGS. 3 and 4. As such, the USB device may operate in the VM OS, as discussed above. In particular embodiments, the disk driver stack may be the disk driver stack of FIG. 3 and the volume driver stack may be the volume driver stack of FIG. 4. In step 504 of FIG. 5, the OS may load (i.e. layer) a second driver on the disk driver stack. In particular embodiments, the second driver may be the SLR driver of FIG. 3. In step 506 of FIG. 5, the OS may load (i.e. layer) the second driver of step 504 on the volume driver stack. In particular embodiments, the second driver may be DELL WYSE's TSREST.SYS. In step 508 of FIG. 5, the OS may restrict an access to the USB device at the second driver as loaded on the disk driver stack. In particular embodiments, step 508 may encompass one or more of steps 302-312 of FIG. 3, where appropriate. In step 510 of FIG. 5, the OS may restrict an access to a volume of the USB device at the second driver as loaded on the volume driver stack. In particular embodiments, step 510 may encompass one or more of steps 402-414 of FIG. 4, where appropriate. Although this disclosure describes and illustrates particular steps of FIG. 5 as occurring in a particular order, this disclosure contemplates any suitable steps of FIG. 5 occurring in any suitable order.

Moreover, although this disclosure describes and illustrates an example method for implementing SLR for particular USB device including the particular steps of FIG. 5, this disclosure contemplates any suitable method for implementing SLR for any suitable USB device including any suitable steps, which may include all, some, or none of the steps of FIG. 5, where appropriate. Furthermore, although this disclosure describes and illustrates particular components, devices, or systems carrying out particular steps of FIG. 5, this disclosure contemplates any suitable combination of any suitable components, devices, or systems carrying out any suitable steps of FIG. 5.

In particular embodiments, a hidden volume (i.e. storage partition) of a SLR-enabled USB storage device operating may be accessed as a virtual volume. In particular embodiments, the SLR-enabled USB storage device may comprise one or more volumes (i.e. storage partitions) that are hidden from one or more users of the VM OS. In particular embodiments, the SLR-enabled USB storage device may operate in a terminal server environment. As an example and not by way of limitation, the terminal server environment may include client device 220 (e.g. a thin client, a slim client, or a lean client) being operated by a VDI that allows client device 220 to communicate with server 240, as discussed above. In particular embodiments, the method of FIG. 5 may allow a plurality of software components associated with the SLR-enabled USB storage device to seamlessly and securely operate in the terminal server environment. To access a hidden volume of the SLR-enabled USB storage device, a software component associated with the SLR-enabled USB storage device may request a user to enter a password. In particular embodiments, if the password as entered by the user is correct (i.e. matches a pre-determined password), the user may access and utilize the hidden volume as a virtual volume. Although the disclosure describes accessing particular hidden volume of particular SLR-enabled USB storage device in a particular manner, the disclosure contemplates accessing any suitable hidden volume of any suitable SLR-enabled USB storage device in any suitable manner.

Figure 6:
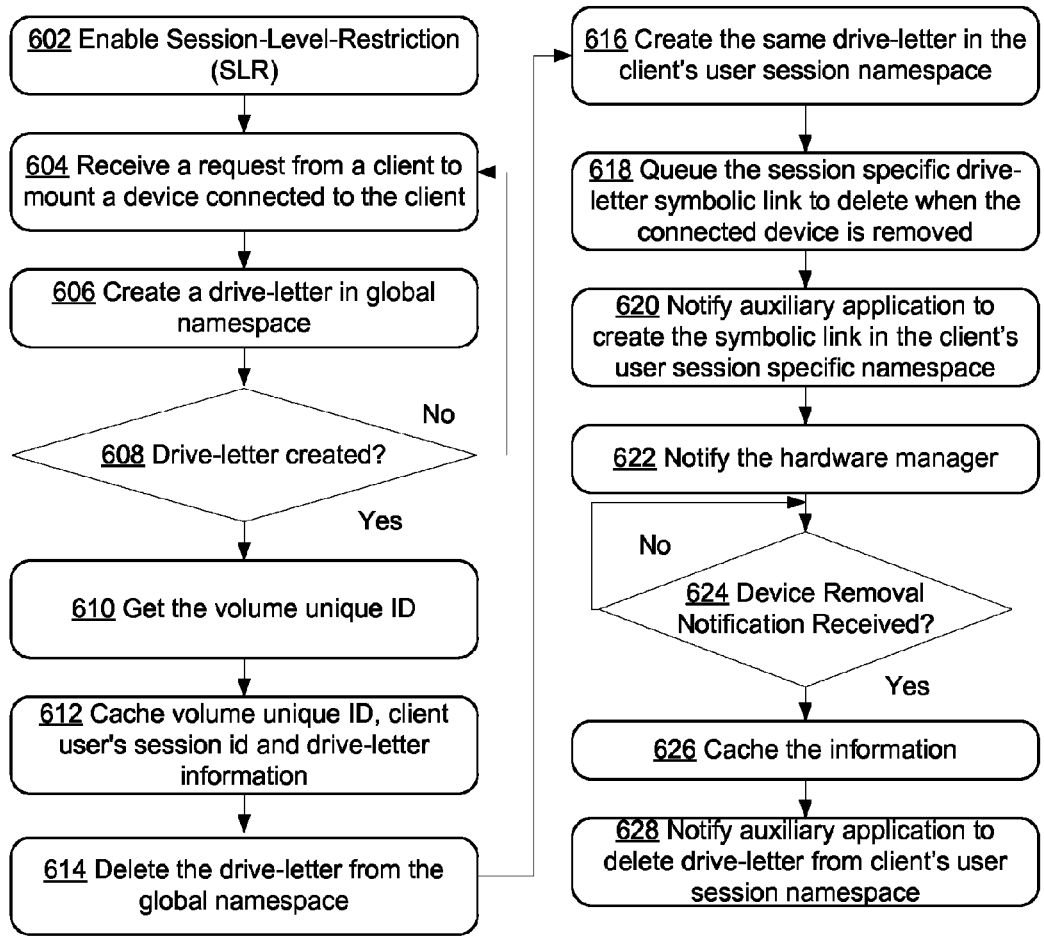
FIG. 6 is an example of a method to implement mounting of a client-device.

In a multi-user environment the drive-letters available for a given server may be exhausted by multiple users connecting and redirecting multiple mass storage devices, such as, USB flash drives, hard disk drives, floppy disk drives, optical disk drives, or any other mass storage device known to one of ordinary skill in the art. When subsequent users attempt to connect and redirect additional devices, the connection requests may fail if available drive letters have been exhausted. For example, twenty-six drive letters may be available for mounting on a typical Windows-based system corresponding to the number of letters in the English alphabet. In past systems, each user would have access to mount any one of the available drives from another system. Once the available number of drives is reached, requests to mount additional drives would be denied. FIG. 6 illustrates an example method of providing protocol independent disjoint driver letter sets for a particular client's user session. In one embodiment the coordination exists between the disk stack, volume manager and mount manager such that disjoint driver letter sets may be assigned for the multiple devices connected by any number of users in a multi-user environment.

In step 602, SLR for disk is enabled at an information handling system as described above, for example, at a server. In step 604, a request is received from a client to mount one or more devices connected to the client. For example, a user may connect a flash drive, or other device, during a user's session to the client. The user may want to access the device connected to the client via an application executing at the server while preventing other users from accessing the device. Thus, the user may want the connected device to be accessible only through the client's user session and no other user session.

In step 606, a drive-letter is created in the global namespace for each device connected to the client, for example, by Windows Mount Manager. In other embodiments, a mount-point to a folder is created for each device connected to the client. For example, a user may connect two devices to the client and expect that each device be assigned a unique drive-letter by the server. In one embodiment, the drive-letter is assigned by Windows Mount Manager. For example, the Wyse SLR driver (filtering volume class stack) may snoop for IOCTL_MOUNTDEV_LINK_CREATED. This IOCTL is sent by the Windows Mount Manager to the Windows Volume Stack when the drive-letter is created. In step 608, it is determined if a drive-letter for the volume has been created. If a drive-letter has been created, then at step 610 the unique ID of the volume is retrieved. In one embodiment, the volume is created by issuing an IOCTL_MOUNTMGR_POINTS to the Windows Mount Manager. In step 612, a drive-letter is created for each connected device using the unique ID. A drive-letter is created in the client's user session namespace. The creation of the volume in the global namespace prevents the use of that drive-letter for any other user session. If the drive-letter for the volume is not created at step 608, the process continues to receive requests from a client to mount a device connected to the client at step 604 or may perform other processing. In one embodiment, a request received such as that in step 604 may trigger an alert, interrupt or set a semaphore, flag, or other indicator that an event has occurred as is well known to one of ordinary skill in the art. The receipt of a request in step 604 may initiate one or more threads for processing the request. The information related to the creation of the volume and other information necessary to sustain the connection and provide access to the device may be cached. For example, the volume name, the volume unique ID, the session ID for the user (client's user specific session), device-type of the connected device (if known), user ID, the drive-letter and any other parameter or information related to the volume or provided by the request for connection or necessary to maintain the accessibility of the device.

In step 614, the drive-letter assigned to the volume for the connected device is deleted from the global namespace. In one embodiment, the drive-letter is deleted by issuing the IOCTL IOCTL_MOUNTMGR_DELETE_POINTS by the Windows Mount Manager. In step 618, a notification is sent to the auxiliary application to create the drive-letter symbolic link in the client user's session name space. All the necessary information has been previously stored in step 612. The drive-letter assigned to the volume for the connected user device is unique only to that user's session and is not available for use by any other user in a different session. In this way, the limited number of drive-letters may be expanded so as to provide the maximum available drive-letters to each unique user session. For example, user A may have two devices connected and be assigned drive-letters "D" and "E" in user A's session while user B may have three devices connected and be assigned driver-letters "D", "E", and "F" in user B's session. User A need not know or be aware that user B has devices connected with the same drive-letter designated as user A cannot access or see any device connected by user B and vice versa. In one embodiment, the Windows Mount Manager manages the drive-letter globally across the users of the information handling system, or the server. Because the Wyse SLR driver manages the drive letter and information on a per user session basis and the information, including the drive-letter, is deleted from the Windows Mount Manager at step 614, the maximum number of assignable drive-letters is not limited to the standard twenty-six letters. Each user receives user-specific drive letters which may mean that each user receives a possible twenty-six drive-letters for mounting.

In one embodiment, the no-drive-letter registry entry is deleted. This registry entry is created in the name of the volume's unique ID at the registry path "HKLM\SYSTEM\MountedDevices". Deleting this key allows the drive-letter to be assigned for the same mass storage device on its next life. A verification occurs that the process of deleting the drive-letter from the global namespace has made the drive-letter available for a different session. In this way, the drive-letter is isolated to the client's user session namespace and not to the global namespace.

In step 616, a drive-letter is created in the client's user session namespace. This drive-letter is the same as the drive-letter that was deleted in step 614. The drive-letter now exists only in the client's user session namespace and not in the global namespace. Thus, if a new device is connected for a different user, that device may be assigned the same drive-letter. In one embodiment, the drive-letter is created in the client's user namespace by the Wyse SLR driver using the IoCreateSymbolicLink API. When creating the drive-letter, for example, the path \\Sessions\0\DosDevices\<user session LUID>\<Drive-letter> may be used. In one embodiment, <Drive-letter> may be "F:" and user-session LUID (which is unique for every client's user session) may be 00000000-000003e4. The resulting path is "\\Sessions\0\DosDevices\00000000-000003e4\R".

One of ordinary skill in the art would understand that the process illustrated above with respect to FIGS. 5, 6, and 7 may be reiterated for each device connected to the client. One of ordinary skill in the art would also understand that the requests to create a volume may be handled sequentially, substantially simultaneously, or any order specified by one or more parameters. For example, the server may query the registry to determine if the "HKLSYSTEM\Mounted Devices" key exists and if so what the values of the entries are for this key. In step 618, the client's user specific session drive-letter symbolic link is queued to be deleted when the connected client device is removed or when any type of disconnection request is received for the connected client device.

When an auxiliary application is running, in step 620 the server notifies the auxiliary application to create the symbolic link for the assigned drive-letter in the client's user session specific space or namespace. In step 622, a manager, for example, a hardware manager, is notified of the creation of the symbolic link. In one embodiment, the Windows explorer.exe is notified by issuing a notification on volume device object using the IoReportTargetDeviceChange or IoReportTargetDeviceChangeAsynchronous APIs. In one embodiment, the hardware manager may be a plug-and-play ("PnP") device manager.

Figure 7:
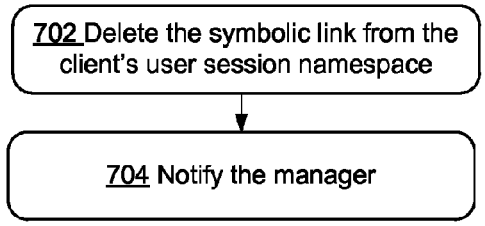
FIG. 7 is an example of a method to delete a symbolic link.

When a device with a previously assigned drive-letter is removed, in step 624 it is determined if a device removal notification has been received. If no device removal notification has been received, the process may continue to poll for such a request or may operate in any other known way understood by one of ordinary skill in the art. If a notification is received, then in step 626 the information associated with the drive-letter may be cached. For example, the volume name, session information and drive-letter may be cached. Next in step 628, the auxiliary application is notified to delete the drive-letter from the client's user session namespace. In one embodiment as illustrated in FIG. 7, the symbolic link may be deleted from the client's user session specific namespace in step 702. Next in step 704, when the symbolic link is deleted, the hardware manager, or the explorer.exe is notified by issuing a notification on volume device object using IoReportTargetDeviceChange or IoReportTargetDeviceChangeAsynchronous API. The manager may pass the cached information associated with the deleted symbolic link and this information may be used, at least in part, by the manager to permit re-allocation or re-mounting of the previously assigned drive-letter.

Figure 8:
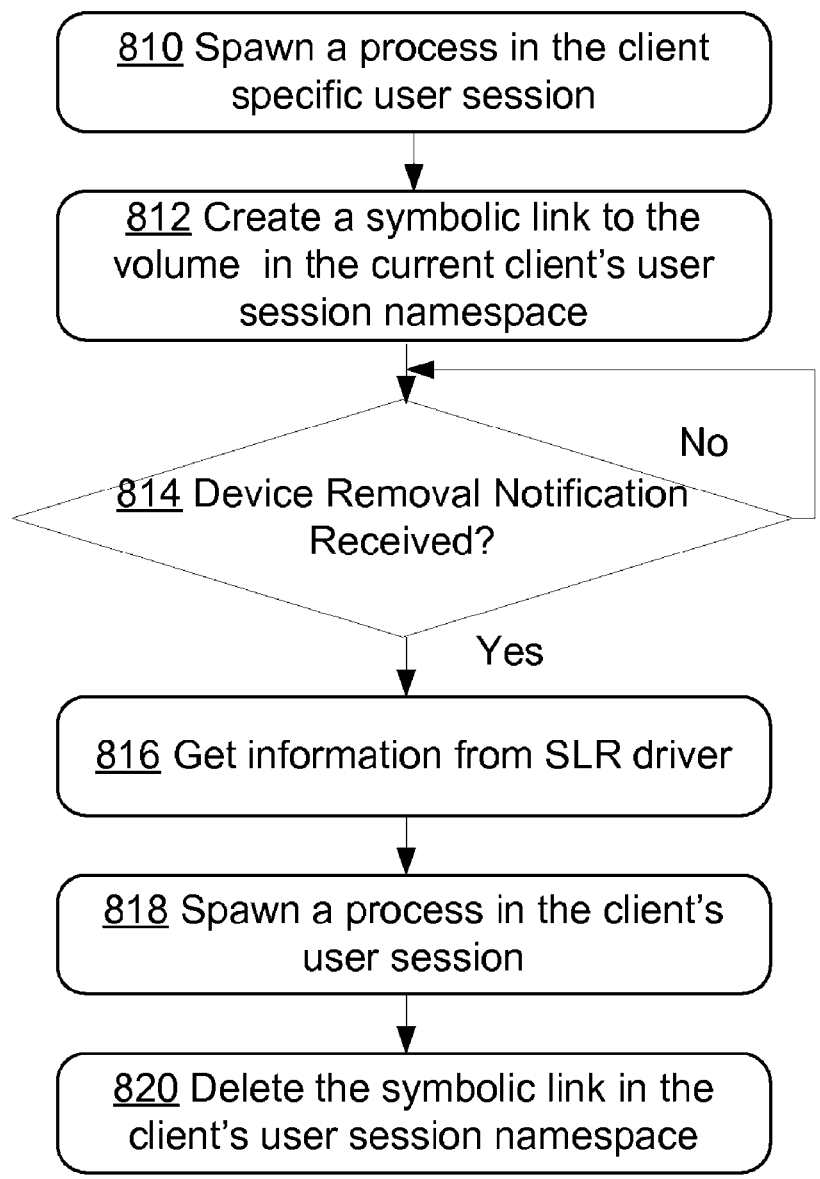
FIG. 8 is an example of a method to implement mounting of a client-device.

FIG. 8 illustrates an process where a separate auxiliary application is running to create the symbolic link in the current client's user session namespace. In one embodiment, the IOCTLs have been issued to the Wyse SLR driver whereupon the drive-letter, volume name and other session information may be cached or stored. In step 810, a process is spawned in the client's user specific session. In step 812, a symbolic link is created to the volume in the current client's user session namespace. In one embodiment, the symbolic link is automatically created in the current client's user session namespace. For example, the drive-letter is automatically created for the volume in the current client's user session namespace using the DefineDosDevice API. This API finds the user session LUID and the path, while creating the drive-letter symbolic link.

The process determines in step 814 if a device removal notification has been received. If a device removal notification has not been received the process continues to poll for such request. Step 814 operates in the same manner as step 624. In step 816 information is retrieved from the SLR driver. This information may be the drive-letter, volume-name or other session information. In one embodiment, the process issues IOCTLs to the Wyse SLR driver to retrieve the information. In step 818, a process is spawned in the client's user session and in step 820 the drive-letter is deleted for the volume. In one embodiment, the drive-letter is deleted automatically from the current client's user session namespace. For example, the drive-letter is deleted from the volume using the DefineDosDevice API which automatically deletes the symbolic link in the current client's user session namespace. The symbolic link may also be deleted in step 822 in the client's user session namespace.

In one embodiment, when there is a drive-letter in both local and global namespace, the drive-letter from local namespace has priority. For example, Windows provides for local namespace priority. In one embodiment, to avoid confusion, when maintain the drive-letter information on a per-user basis or a per client user session basis, if there is a drive-letter already created in global namespace, the same drive-letter may not be created in the current client's users session namespace. For example, the Wyse SLR driver maintains information on a per-user basis and thus does not permit the allocation of a volume with a drive-letter for a specific user session that is the same as a global namespace drive letter. For example, in general, all Windows systems allocate the drive-letter "C:" as the system drive in global namespace. The Wyse SLR drive for a connected device, for example, a USB drive, does not permit the creation of a drive-letter "C:" in any client's user session namespace.

The processes illustrated in FIGS. 6, 7, and 8 may be reiterated for each device connected to the client. The processes illustrated in FIGS. 6, 7, 8, may also in one embodiment be limited to a predetermined number of client specific connected devices. The limit on client specific connected devices may be less than the total number of allowable or available drive-letters. The limit may also be determined based, at least in part on, the type of devices connected to the client. In one embodiment the process of FIGS. 6, 7, and 8 may be implemented on the information handling system of FIG. 1 and as further illustrated in FIG. 2.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   enabling a session level restriction (SLR);
   receiving a request from a first user of a first client to mount a device connected to the first client;
   creating a volume for the connected device;
   determining if a first drive-letter for the volume has been created;
   retrieving a unique ID for the volume;
   caching information related to the first drive-letter;
   deleting the first drive-letter from global namespace;
   creating a first symbolic link in a first user session namespace based, at least in part, on the cached information, wherein the symbolic link is a second drive-letter; and
   notifying a manager that the first symbolic link has been created.

2. The method of claim 1, further comprising:
   verifying that the first drive-letter is available for mounting in a second user session namespace.

3. The method of claim 1, further comprising:
   queuing the first symbolic link to be deleted when the connected device is removed.

4. The method of claim 1, further comprising:
   receiving a device removal notification;
   caching the information; and notifying a first auxiliary application to delete the first symbolic link from the first user session namespace.

5. The method of claim 1, further comprising:
receiving a device removal notification;
caching the information;
deleting the first symbolic link from the first user session namespace; and
notifying the manager that the first symbolic link has been deleted.

6. The method of claim 1, wherein the connected device is a mass storage device.

7. The method of claim 1, wherein the symbolic link is created by a second auxiliary application.

8. The method of claim 7, further comprising:
receiving a removal notification;
retrieving the information from an SLR driver;
spawning a process in a first user session associated with the first user session namespace; and
deleting, by the second auxiliary application, the first symbolic link from the first user session namespace.

9. The method of claim 1, wherein priority is given to the first symbolic link associated with the first user session namespace.

10. The method of claim 1, further comprising:
receiving a request from a second user of a second client to mount a device connected to the second client;
creating a second volume for the second connected device;
determining if a second symbolic link for the second volume has been created, wherein the second symbolic link is a third drive-letter;
retrieving a second unique ID for the second volume, wherein the third drive-letter is the same as the second drive-letter;
caching second information related to the third drive-letter;
deleting the third drive-letter from the global namespace; and
notifying the manager when the second symbolic link has been created.

11. One or more computer-readable non-transitory storage media embodying logic that is operable when executed to:
by an operating system:
enabling a session level restriction (SLR);
receiving a request from a first user of a first client to mount a device connected to the first client;
creating a volume for the connected device;
determining if a first drive-letter for the volume has been created;
retrieving a unique ID for the volume;
caching information related to the first drive-letter;
deleting the first drive-letter from global namespace;
creating a first symbolic link in a first user session namespace based, at least in part, on the cached information, wherein the first symbolic link is a second drive-letter; and
notifying a manager that the first symbolic link has been created.

12. The media of claim 11, further comprising:
by the operating system:
verifying that the first drive-letter is available for mounting in a second user session namespace; and
queuing the first symbolic link to be deleted when the connected device is removed.

13. The media of claim 11, further comprising:
by an operating system:
receiving a device removal notification;
caching the information;
deleting the first symbolic link from the first user session namespace; and
notifying the manager that the first symbolic link has been deleted.

14. The media of claim 11, wherein the first symbolic link is created by a second auxiliary application.

15. The media of claim 14, further comprising:
by the operating system:
receiving a removal notification;
retrieving the information from an SLR driver;
spawning a process in a first user session associated with the first user session namespace;
deleting the second drive-letter from the first user session namespace;
deleting, by the second auxiliary application, the first symbolic link.

16. The media of claim 11, further comprising:
by the operating system:
receiving a request from a second user of a second client to mount a device connected to the second client;
creating a second volume for the second connected device;
determining if a second symbolic link for the second volume has been created, wherein the second symbolic link is a third drive-letter;
retrieving a second unique ID for the second volume, wherein the third drive-letter is the same as the second drive-letter;
caching second information related to the third drive-letter;
deleting the third drive-letter from the global namespace; and
notifying the manager when the second symbolic link has been created.

17. An information handling system comprising:
one or more processors; and
a memory coupled to the processors comprising instructions executable by the processors, the processors being operable when executing the instructions to:
by an operating system:
enabling a session level restriction (SLR);
receiving a request from a first user of a first client to mount a device connected to the first client;
creating a volume for the connected device;
determining if a first drive-letter for the volume has been created;
retrieving a unique ID for the volume;
caching information related to the first drive-letter;
deleting the first drive-letter from global namespace;
creating a first symbolic link in a first user session namespace based, at least in part, on the cached information, wherein the first symbolic link is a second drive letter; and
notifying a manager that the first symbolic link has been created.

18. The information handing system of claim 17, further comprising:
by the operating system:
receiving a device removal notification;
caching the information;
deleting the first symbolic link from the first user session namespace; and
notifying the manager that the first symbolic link has been deleted.

19. The information handling system of claim 17, further comprising:

by the operating system:
wherein the first symbolic link is created by a second auxiliary application;
receiving a removal notification;
retrieving the information from an SLR driver;
spawning a process in a first user session associated with the first user session namespace;
deleting the second drive-letter from the first user session namespace; and
deleting, by the second auxiliary application, the first symbolic link.

20. The information handling system of claim 17, further comprising:

by the operating system:
receiving a request from a second user of a second client to mount a device connected to the second client;
creating a second volume for the second connected device;
determining if a second symbolic link for the second volume has been created, wherein the second symbolic link is a third drive-letter;
retrieving a second unique ID for the second volume, wherein the third drive-letter is the same as the second drive-letter;
caching second information related to the third drive-letter;
deleting the third drive-letter from the global namespace; and
notifying the manager that the second symbolic link has been created.

* * * * *